United States Patent Office 3,764,492
Patented Oct. 9, 1973

3,764,492
ELECTROLYTIC PREPARATION OF ESTERS FROM ORGANO HALIDES
Manuel M. Baizer, Creve Coeur, and John H. Wagenknecht, Kirkwood, Mo., assignors to Monsanto Company, St. Louis, Mo.
No Drawing. Filed Jan. 10, 1972, Ser. No. 216,721
Int. Cl. C07b 29/06; C07c 67/00, 69/00
U.S. Cl. 204—59 R                                   17 Claims

ABSTRACT OF THE DISCLOSURE

Esters are obtained by electrolytic reduction of a mixture of aliphatic halide and carbon dioxide.

BACKGROUND OF THE INVENTION

The present invention relates to the electrolytic preparation of esters from organo halides. In particular the invention relates to the reaction of such halides with carbon dioxide to prepare esters in an electrolytic reduction reaction.

Esters are well known industrial chemicals, having such diverse uses as plasticizers, monomers for the preparation of polyesters by interaction with glycols, or unsaturated monomers for preparation of addition polymers. It has previously been known that esters can be prepared by reaction of alkyl halides with alkali metal salts of carboxylic acids, or by similar reactions with tertiary amine salts. Such reactions generally require use of elevated temperatures or other stringent conditions which, while often effective, are not always well suited when the reactants are unstable to heat. Electrolysis of some halides in the presence of carbon dioxide has also been reported previously, note Wawzonek et al., J. Electrochem. Soc., vol. 111, pp. 74 to 78, (1964), in which the main product from benzyl halide was toluene, but a minute amount of phenylacetic acid was noted in one instance.

SUMMARY OF THE INVENTION

The present invention involves electrolytic reduction of organo halides in the presence of carbon dioxide and the recovery of esters from the electrolysis. The preparation of esters in the electrolysis requires conditions under which the carboxylation can occur, as well as conditions suitable for the esterification reaction and recovery of the ester.

DETAILED DESCRIPTION OF THE INVENTION

The process of the present invention can be represented:

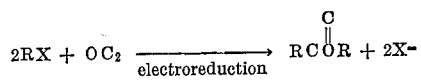

in which X is a halogen atom, which is usually Cl, Br or I, but can be F, although fluorides are generally fairly difficult to react; in which R is a monovalent radical in which the halides is attached to a valence on aliphatic carbon, i.e., RX is an aliphatic halide, although the R may have aromatic substituents, and R is general can be any alkyl group, e.g., methyl, ethyl, propyl, isopropyl, butyl, isobutyl, hexyl, etc., or aralkyl groups, e.g. benzyl phenylethyl, etc., or alkenyl groups, e.g. allyl, crotyl, 3-butenyl, etc. R in general will be selected so as not to have groups which prevent the desired reaction and will most often be a hydrocarbyl group, either saturated or unsaturated, but it can contain other groups which are relatively inert, such as ether groups, or cyano groups which are usually in positions nonadjacent to the halide group, and some of which may undergo some chemical reaction in the course of the electrolysis or subsequent treatment, so long as they do not interfere in the desired esterification. The R group can also contain additional halide groups, although such groups may result in the production of polyesters, rather than monoesters, and in the case of organic dihalides may result in the production of polyesters in the form of oligomers or high polymers. The halides of practical interest for esterification herein will generally contain up to 20 or so carbon atoms, and often less than 10 carbon atoms, and accordingly the size of the R groups will usually be limited. A possible mechanism of the reaction can be pictured

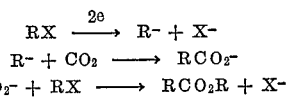

but the reaction is part of the present invention regardless of what the actual mechanism may be. If a quaternary ammonium salt is used as electrolyte, the reaction can then be illusutrated as proceeding through the salt as intermediate

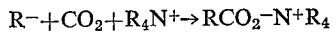

and the quaternary salt then reacts with the halide to produce the ester

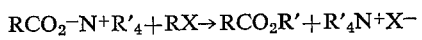

R' is an organic radical, e.g. alkyl, aryl, alkaryl, aralkyl, etc. In the illustrated mechanisms it is also possible for the R- anion to react with protons to form RH, or with alkyl halide to form RR, so it is desirable to avoid conditions promoting such side reactions.

Quaternary ammonium salts of the carboxylic acids readily react with the halides to form esters, and the quaternary ammonium salts thus facilitate the ester formation when used as supporting electrolyte for the electrolysis, or otherwise present during the electrolysis. Sulfonium and phosphonium salts may behave similarly and facilitate the ester formation. Various other supporting electrolytes can be used with some degree of success in the electrolysis for the formation of esters, although yields will generally be inferior to those with the quaternary ammonium salts unless heating or other aids are empolyed to promote the esterification. In general it will be noted that the esters produced contain the R of the halide reactant, plus a carboxyl group, as the acid moiety of the ester, and R itself as the esterifying radical. Of course, mixed products containing different R groups in the ester can result if a mixture of halides is used as reactant, or if other carboxylic acids are present in the electrolysis medium. When allyl halide is used as reactant, rearrangement of the double bond is likely, and the ester product generally produced is allyl crotonate, rather than allyl 3-butenoate, although the latter may be present as an intermediate:

$2CH_2=CHCH_2Cl + CO_2 \xrightarrow{\text{electroreduction}}$

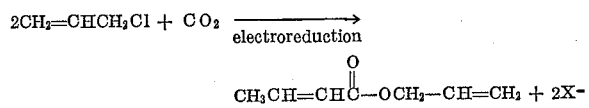

While there may be a shift of the double bond, it should be noted that it is retained in the product and apparently does not play an active part in the reaction leading to the ester.

Thus alkenyl halides produce alkenyl alkenoates. Olefinic groups are known to be subject to coupling under various conditions, including various electrolytic conditions, so that compounds containing such groups present a number of possible reaction routes other than that leading to the unsaturated esters. Moreover, products such as allyl crotonate are subject to hydrodimerization under appropriate electrolysis conditions, and thus can be converted to diallyl 3,4-dimethyl adipate if desired. The direction of the reaction to the simple crotonate ester is effected by utilizing a cathode potential less positive than the half-wave potential of allyl crotonate (—2.31 volts vs. saturated calomel electrode). Aside from the reactivity of the unsaturated halides, the feasibility of preparing esters with unsaturation in both moieties of the ester makes the reaction of special interest for preparation of such esters.

Benzyl and similar halides, are, of course, known for their particular reactivity, and reactions of such halides provides another class of esters.

In the ordinary alkyl halides, the halogen is not very labile, and the suitability of such halides for the present reaction involves considerations different from the more labile halides, but the alkyl halides have been found suitable. Primary, secondary, and tertiary halides can be used, although results with tertiary halides may be poor due to hydrolytic and dehalogenation reactions, or other causes.

While the present discussion and illustrations primarily describe reactions involving reductions of the organo halide, it will be recognized that carbon dioxide is subject to electrolytic reduction and that the ester production may at times involve such reduction of carbon dioxide.

The electrolysis is carried out by passing an electric current through the organo halide in contact with a cathode. The organo halide or the medium in which it is employed must have sufficient conductivity to conduct the electrolysis current. While media of poor conductivity can be employed, it is preferred from an economics standpoint not to have too high a resistance. The required conductivity is generally achieved by employing common supporting electrolytes, such as electrolyte salts of sufficiently negative discharge potentials, usually along with a liquid having a fairly good dielectric constant. Electrolyte salts in general have poor solubility in organo halides, and it is desirable to employ a non-aqueous solvent along with the organo halide to aid in the solution or dispersion of the electrolyte. In general any combination of electrolyte and solvent can be employed which gives the desired conductivity and is sufficiently compatible with the organo halide to permit its electrolysis. It is generally desirable to have the electrolyte, organo halide and solvent in a fairly homogeneous dispersion, but a true solution is not necessarily required as, for example, many quaternary ammonium salt solutions may, in some respects, be dispersions rather than true solutions. Thus the present invention may use emulsions as well as true solutions. Moreover in emulsions or media having more than one phase, electrolyses can occur in a solution of the components in one of the phases.

Aside from the conditions necessary for the desired electrolysis, the electrolysis will generally be conducted under conditions which do not facilitate non-electrolytic side-reactions. Some halides, e.g. benzyl halides, 2-alkenyl halides, etc. are characterized by relatively labile halide ions, and are therefore subject to hydrolytic and similar reactions. These considerations do not ordinarily present any difficulty when the usual electrolyte salts and non-aqueous electrolysis media are employed. The desired reaction does not involve hydrogenation or other reduction of olefinic bonds when present, and is not conducted under conditions to promote such reactions. There is no need in the present process for the presence of water or similar proton donors (as required in hydrodimerization reactions), and under the conditions employed there is ordinarily no observation of hydrogen generation, and the reaction can be conducted with, at most, a very minor amount of reduction of any olefinic bonds in the reactant.

In the solvens employed herein, it will generally be desirable to select a solvent of fairly high dielectric constant in order to lower the electrical resistance. Of course, the choice and concentration of electrolyte salts can also be used to lower the electrical resistance. Solvents desirable for use herein include, for example, dimethylformamide, acetonitrile, hexamethylphosphoramide, dimethylsulfoxide, etc. Methylene chloride can be used, but its conductivity is poor, and it may also serve as a reactant. In general it is desirable to employ a solvent with a dielectric constant of at least 25, and preferably of at least 50.

The present reaction does not require any source of protons to avoid free radical polymerizations, as tends to be necessary with some reductive dimerizations of olefinic compounds. This was not readily foreseen since the same type of radical intermediate can be postulated for allyl chloride, as apparently is involved in electrolytic polymerization of acrylonitrile, for example. In any event, protons are apparently unnecessary in the present process, so it is not necessary to employ solvents which donate protons, or to work out the control of the concentrations of such solvents to avoid protonation of intermediates in competition with the desired ester forming reaction. Aprotic solvents can suitably be utilized, particularly those of dipolar character which exhibit high dielectric constants. However, if desired for some reason, water or other proton donors can be employed if proper small concentrations are used, and particularly if high concentrations of quaternary ammonium salts are employed. The quaternary ammonium salts apparently have some effect in protecting intermediates developed at the electrode surface from protonation.

With the electrolyte and solvent materials usually employed, the catholyte will generally be approximately neutral, so far as acidity-basicity is concerned, and no particular provisions are necessary to regulate this parameter. However, it will usually be desirable to operate under near neutral conditions in order to avoid possibly promoting hydrolytic or other side reactions, or protonation of intermediates. In long term continuous reactions with re-use of catholyte media, it may be desirable to use buffers or to adjust pH periodically to desired values. Such considerations may be of minor significance since the electrolysis in non-aqueous media does not generally involve discharge of hydroxyl ions or generation of protons, and pH measurements are not particularly appropriate for such media.

In carrying out the present process, a supporting electrolyte is generally used to enhance conductivity. With some combinations of organo halides and solvents, an additional electrolyte may not actually be necessary, but in practice a supporting electrolyte is utilized in the present invention. A supporting electrolyte, as understood by those in the art, is an electrolyte capable of carrying current but not discharging under the electrolysis conditions. In the present invention this primarily concerns discharge at the cathode, as the desired reaction occurs at the cathode. Thus the electrolytes employed will generally have cations of more negative cathodic discharge potentials than the discharge potential of the organo halide used. An electrolyte with a similar or slightly lower discharge potential than the organo halide may be operative to some extent, but yields and current efficiency are adversely affected, so it is generally desirable to avoid any substantial discharge of the electrolyte salt during the electrolysis. Different halogens in the olefinic reactant will ordinarily result in different discharge potentials, with the iodide being less negative than the bromide, which is less negative than the chloride. It will be recognized that discharge potentials will vary with cathode materials and their surface condition, and various materials in the electrolysis medium, and it is only necessary to have an effective reduction of the organo halide under the conditions of the electrolysis, and some salts may be effective supporting electrolytes under such conditions even though nominally of less negative discharge potential than the organo halide employed.

In general any supporting electrolye salts can be utilized in effecting the present process, with due consideration to having conditions suitable for the discharge of the organo halide involved. The term salt is employed in its generally recognized sense to indicate a compound composed of a cation and an anion, such as produced by reaction of an acid with a base. The salts can be organic, or inorganic, or mixtures of such, and composed of simple cations and anions, or very large complex cations and anions. Amine and quaternary ammonium salts are generally suitable for use herein, as such salts generally have very negative discharge potentials. Certain salts of alkali and alkaline earth metals can also be employed to some extent, although more consideration will have to be given to proper choice of the organo halide in order to achieve a discharge, with the use of the bromide or iodide being advisable in some cases, depending upon the cation discharge potential. Among the quaternary ammonium salts useful, are the tetraalkyl ammonium, e.g., tetraethyl or tetramethyl ammonium, methyltriethylammonium etc., heterocyclic and aralkyl ammonium salts, e.g. benzyltrimethylammonium, etc., heterocyclic and aralkyl ammonium salts, e.g., benzyltrimethylammonium, etc. Various anions can be used with the foregoing and other cations, e.g. organic and inorganic anions, such as phosphates, halides, sulfates, sulfonates, alkylsulfates, etc. Aromatic sulfonates and similar anions, e.g. p-toluenesulfonates, including those referred to as McKee salts, can be used, as can other hydrotropic salts, although the hydrotopic property may have no particular significance when employed in non-aqueous media herein. It will be desirable to have some material present which is capable of a non-interfering discharge at the anode, such as some portion of a halide salt, in order that current can be carried without producing interfering contaminants. However, after initial electrolysis, the halide ion liberated from the organo halide can migrate to the anode and be discharged there and most salt anions will not thereafter be subject to discharge at the anode. In general the salts disclosed in patent 3,390,066 of one of us as suitable for hydrodimerization of certain allyl compounds, can also be employed in the present process, although the solubility considerations for the aqeous media there discussed are not essential to the present process. The concentration of salts, when used, can vary widely, e.g. from 0.5% to 50% or more by weight of the electrolysis medium, but suitable concentrations will often be in the range of 1% to 15% by weight. If it is desired to have all the components in solution, the amount of salt utilized will then be no greater than will dissolve in the electrolysis medium.

In some cases under some conditions there may be advantages in using simple salts, such as lithium salts, and results may be comparable to or better than those obtainable with more complex salts. However, for general applicability and suitability at strongly negative discharge conditions, quaternary ammonium salts, or salts which discharge at more negative potentials than —2.2 cathodic volts versus the saturated calomel electrode, are preferred. The term quaternary ammonium is used herein in its generally recognized meaning of a cation having four organo radicals substituted on nitrogen. Aside from the value of quaternary ammonium salts as supporting electrolytes, the present applicants have found that quaternary ammonium salts of carboxylic acids are readily esterified by organo halides, and it appears that such salts are an intermediate in the present electrolytic ester forming process when quaternary ammonium salts are present.

The concentrations of organo halide can vary widely, e.g. constituting most of the electrolysis medium (save for electrolyte salt) if no solvent is used, or being present in very dilute solution. In general the alkyl halide will be in the range of about 0.5% to 50% by weight of the electrolysis medium, and often in the range of 1% to 15% by weight. In continuous processes, the organo halide concentration will probably be maintained close to some constant value, and the ester product will also be present in fair amount in the electrolyte, depending upon the conversion attained as determined by the timing and amount of product separation. For example, the process can be operated at conversions of 20 to 60% or so (or other desired rates), and the unreacted halide component recycled. In carrying out the reaction it may at times be desirable to promote the ester-forming reaction by insuring a sufficient concentration of carbon dioxide, and avoiding excess organo halide, as for example, by adding the organo halide gradually during the electrolysis and having only small increments present in the electrolytic cell at any time.

In effecting the present process when only an anionic route is available, the cathode potential will have to be sufficient to achieve reaction by such route. When both radical and anionic routes are available, the control of the cathode voltage can have considerable influence upon the course of the reaction. With allyl chloride, in the absence of bromine ion, the electrolysis will generally be conducted at cathode voltages (vs. saturated calomel electrode) at least as negative as —1.8 and possibly as or more negative than —2.25. To achieve the discharge, it is not necessary to actually reach the half-wave potential, as the discharge will start at somewhat lower potentials, with increasing current up to and beyond the half-wave potential. With allyl bromide, either radical or anionic routes appear available. At potentials at or more negative than —1.8, it appears that an anionic course is followed (by taking up two electrons), while at less negative potentials, there may be radicals formed (by taking up one electron) which form intermediate compounds with the electrode, particularly when a mercury electrode is used. While there are possible explanations for variations in yield found, there may be advantages in the use of conditions to effect an anionic route, that is, to add two electrons to the allyl halide at the cathode.

Various current densities can be employed in the present process. It will be desirable to employ high current densities in order to achieve high use of electrolysis cell capacity, and therefore for production purposes it will generally be desirable to use as high a density as feasible, taking into consideration sources and cost of electrical current, resistance of the electrolysis medium, heat dissipation, effect upon yields, etc. Over broad ranges of current density, the density will not greatly affect the yield. Suitable ranges for operation will be in ranges from a few amperes/square decimeter of cathode surface, up to 10 or 100 or more amperes/decimeter.

The present electrolysis can be conducted in the various types of electrolysis cells known to the art. In general such cells comprise a container made of material capable of resisting action of electrolytes, e.g. glass or plastics, and a cathode and anode, which are electrically connected to sources of electric current. The anode can be of any electrode material so long as it is relatively inert under the reaction conditions. Ordinarily the anode will have little or no influence on the course of the electrolysis, and can be selected so as to minimize expense and any corrosion, or erosion problem. Any suitable materials can be employed as the cathode, various metals, alloys, graphite, etc. being known to the art. However, the cathode materials can have some effect upon the ease and efficiency of the reaction. The half-wave discharge potential of organo halides will vary with the electrode material, and ordinarily the electrolysis will be facilitated by employing electrodes in the lower ranges of discharge potentials. However, it should be noted that performance of the materials can be greatly affected by surface characteristics, alloying, or impurities, e.g. stainless steel gives different half-wave potentials than iron. Aluminum appears to require a very negative discharge potential, and apparently would require use of some especially difficultly reducible electrolyte. Many of the suitable metals will exhibit half-wave potentials with allyl bromide less negative than —1.8 volts. For production purposes mercury or various metals coated with amalgams may be well suited, and lead, stainless steel, etc. and their alloys may also be good choices. Mercury, lead, etc. and materials which appear to take part in the reaction apparently favor the ester forming reaction. For example $R_2Hg$ can be pictured as providing an $R^-$ anion for reaction with carbon dioxide, followed by reaction with alkyl halide to form an ester.

In the present process a divided cell will ordinarily be employed, i.e., some separator will prevent the free flow of reactants between cathode and anode. Generally the separator is some mechanical barrier which is relatively inert to the electrolyte materials, e.g., a fritted glass filter, glass cloth, asbestos, porous polyvinyl chloride, etc. An ion exchange membrane can also be employed. The desired reduction will occur in an undivided cell, but a difficulty may be presented in recovery of product without substantial interference from subsequent reactions, in some instances. For example, halogen is generated at the anode, and the halogen can halogenate the olefinic bonds of esters formed from alkenyl halides. This can possibly be prevented by such expedients as adding an olefin, e.g., propylene, near the anode to trap the halogen generated there, or by designing cells with electrolyte flow appropriate to keep halogen from the vicinity of the cathode.

When a divided cell is used, it will be possible to employ the same electrolysis medium on both the cathode and anode sides, or to employ different media. Ordinarily it will be desirable to employ the same salt and solvent, with possible addition of some halide salt to the anolyte if not already present, to provide an initial source of halide for discharge. In some circumstances it may be advisable to employ a different anolyte, for economy of materials, lower electrical resistance, etc.

The electrolysis cells described in the procedural examples herein are primarily for laboratory demonstration purposes. Production cells are usually designed with a view to the economics of the process, and characteristically have large electrode surfaces, and short distances between electrodes. The present process is suited to either batch or continuous operations. Continuous operations can involve recirculation of a flowing electrolyte stream, or streams, between electrodes, with continuous or intermittent sampling of the stream for product removal. Similarly, additional reactants can be added continuously or intermittently, and salt or other electrolyte components can be augmented, replenished, or removed as appropriate. Additional description of a suitable cell for continuous operation is set forth in U.S. Patent 3,194,480 of one of us and others.

The products obtained in the present process can be recovered by a variety of procedures. A chromatographic analysis has been largely used for convenient separation and identification in the procedural examples herein. However, for production purposes, a separation by distillation, extraction, or a combination of such procedures will probably be employed. Distillation can be employed if there is sufficient difference in boiling points of the solvents, reactants, and ester products. Most of the simple esters can be distilled without any extensive thermal decomposition. Most of the esters will tend to be soluble in organic phases, rather than aqueous phases, and extraction with organic solvents, such as n-hexanes or diethyl ether are often suitable. Methylene chloride can similarly be used. Treatment with acids or bases can also be used in separations, with due care being taken to avoid saponification of the ester, and noting that the ester will generally be in the organic phase, while salts of the acids may be in the aqueous phase. Organo halide reactants can be distilled from the catholyte and recycled to the electrolysis in continuous procedures.

The electrolysis can be conducted at ambient temperatures, or at higher or lower temperatures. If allyl chloride is utilized, it is desirable to avoid elevated temperatures so that the volatile reactant will not escape, and various cooling means can be used for this purpose. Cooling to ambient temperatures is sufficient, but if desired temperatures down to 0° C. or lower can be employed. The amount of cooling capacity needed will depend upon the cell resistance and the electrical current drawn. If desired cooling can be effected by permitting a component, such as allyl chloride, to reflux through a cooling condenser. Pressure can be employed to permit electrolysis at higher temperature with volatile reactants, but unnecessary employment of pressure is usually undesirable from an economic standpoint.

The present electrolysis is not particularly sensitive to atmospheric effects, and it is not necessary to utilize an inert atmosphere or the like. Residual oxygen, extraneous moisture, etc. can be removed from the reactants and solvents before commencing the reaction, but this is not an essential precaution. Oxygen is subject to reduction to hydroxyl ion, which could have some hydrolytic effect. There is no apparent tendency toward polymerization in the electrolysis, but, if desired, polymerization inhibitors, such as those for inhibiting free radical polymerization, e.g. quinones, can be present. Of course, caution should be exercised against any excessive presence of proton donors.

EXAMPLE 1

A 60 ml. solution of dimethylformamide having a 0.2 molar concentration of tetraethylammonium chloride was charged to the cathode side of an electrolysis cell, and 75 mol. of the same solution containing a small amount of decene-1 was charged to the anode side. The electrolysis cell employed had cathode and anode compartments separated by a glass frit. The cathode was a mercury pool in the bottom of the cathode compartment having a surface area of 15.5 cm.$^2$. The anode was a rectangular platinum plate of 5.75 cm.$^2$ area. The cathode compartment was equipped with a mechanical stirrer and a saturated calomel reference electrode connected to the cathode by a salt bridge. The cathode side was fitted with a small glass pipette to permit delivery of $CO_2$ gas under the surface of the catholyte near the cathode surface. Both cathode and anode sides of the cell were provided with reflux condensers, with that on the cathode side being cooled by Dry Ice and having a nitrogen atomsphere at its outlet. The equipment was deaerated with carbon dioxide. A 6.33-gram amount (0.05 mole) of benzyl chloride was added dropwise to the catholyte during the electrolysis. Prior to the addition, a cathode voltage of −2.34 volts (vs. saturated calomel electrode) was established, with a current of about 0.22 ampere. The values changed to −2.37 volts and 0.5–0.6 ampere after addition of the benzyl chloride started. A cooling bath was employed to maintain the temperature near 25° C., and the benzyl chloride was added in about three hours. There was some migration of anolyte to the catholyte compartment, and additional quaternary salt solution was added to the anolyte to compensate. The electrolysis was continued for about three additional hours, for a total current expenditure of 0.095 Faraday. A sample of the catholyte was analyzed by gas chromatography, employing biphenyl as internal standard, and a 10% Carbowax 20 M (waxy polyethylene glycol) supported on a diatomaceous ceramic, with the sample heated to 100° C. for one minute and raised to 220° at 20° per minute, to show very small amounts of toluene and bibenzyl. The solution in the biphenyl was acidified and treated with a silyl compound, Regilsil (bis(trimethylsilyl)trifluoroacetamide), to convert free acid to a stable compound, and analyzed on a column under the above temperature conditions, and a small amount of phenylacetic acid was identified. In the chromatography, other peaks were found, and one of them was identified as benzyl phenylactate, and quantified as 4.45 grams. The ester was identified by retention time on two columns the same as an authentic sample of benzyl phenylacetate. The chemical yield of benzyl phenylacetate was approximately 78%, and the current efficiency about 40%. The catholyte was treated with sodium carbonate, stripped of solvent evaporation, and the residue extracted with ether. The ether extracts were washed with sodium carbonate, then with water, dried over magnesium sulfate, and the ether stripped off to leave a weight of 3.8 grams, which was identified as mostly benzyl phenylacetate.

EXAMPLE 2

Allyl chloride was electrolyzed in the presence of carbon dioxide, employing the electrolysis cell described in Example 1. As catholyte, 60 ml. of a 0.2 molar solution of tetraethylammonium chloride in dimethylformamide was used, and it was deaerated for thirty minutes with carbon dioxide. The anolyte was 75 ml. of the same solution containing a small amount of decene-1, and with additional salt added to saturation. With a cathode voltage of $-2.05$ volts (vs. saturated calomel electrode), there was a background current of 0.032 ampere. Allyl chloride addition was started dropwise, and the current varied from about 0.16 ampere to 0.42 ampere during the 5.5 hour addition. The electrolysis was continued for about 3 more hours. The electrolysis was conducted at about 25° C., $-2.05$ cathode volts, and with a total current expenditure of 0.76 Faraday. Carbon dioxide was bubbled throughout the electrolysis. Allyl crotonate in the catholyte was identified by chromatography of samples taken during the electrolysis, employing a column having a free fatty acid phase, and raising the sample from 100° to 220° in ten minutes. The catholyte was transferred from the electrolysis cell and analyzed on the chromatographic column, employing ethyl butyrate as the internal standard. It appeared that the amount of allyl crotonate had dimenished from the previous sample, possibly because of polymerization resulting from contact with air. The catholyte contained 1.6 gram allyl chloride and 0.542 gram allyl crotonate.

EXAMPLE 3

An electrolysis cell with a mercury cathode and platinum anode was employed for electrolysis of pentylbromide in the presence of carbon dioxide. The catholyte and anolyte were saturated solutions of tetraethylammonium bromide in dimethylformamide. The cathode voltage was controlled at $-2.6$ volts (vs. saturated calomel electrode) by a potentiostate, to give a background current of 400 milliamperes with carbon dioxide. Upon addition of 4 ml. pentyl bromide, the current rose to 500 milliamperes. An additional 5 milliliters was added, and electrolysis was conducted at 400–600 milliamperes for about 8 hours, for a total of 0.142 Faraday as indicated by the coulometer. The cattholyte was analyzed by chromatography on a silicone rubber (S.E. 52, a 5% phenyl, 95% methyl silicone rubber, in a 10% concentration on a diatomaceous earth) column programmed from 50° to 280° at 15°/minute and was found to contain 0.564 grain pentyl hexanoate. The catholyte was distilled at 10 mm. Hg to remove dimethylformamide, and the residue was extracted with ether. The ether was evaporated from the extracts, and the residue was indicated by mass spectroscopy to contain pentyl hexanoate, along wtih some dipentyl carbonate and dipentyl mercury.

EXAMPLE 4

A divided cell was employed with mercury cathode and platinum anode. The catholyte was a 200 ml. solution of 0.1 molar tetrapropylammonium borontetrafluoride in dimethylformamide and 10 ml. 1-chloropentane, and the anolyte was a 50 ml. solution of the same salt in dimethylformamide. The catholyte was deaerated with nitrogen, and potential was applied at $-2.4$ cathode volts (vs. saturated calomel electrode). The catholyte was saturated with carbon dioxide and electrolysis was conducted overnight at about 110 milliamperes with constant carbon dioxide bubbling. A total of 0.092 Faraday was used. A small amount of pentyl heaxanoate was identified by chromatographic analysis of the catholyte.

EXAMPLE 5

An electrolysis was conducted with a graphite cathode and platinum anode, employing 0.1 molar solutions of tetraethylammonium bromide as catholyte and anolyte. A 10 ml. amount of butyl bromide was added to the catholyte, and it was saturated with carbon dioxide. The electrolysis was conducted at $-2.4$ cathode volts (vs. saturated calomel electrode), for a total of about 0.17 Faraday. Chromatographic analysis of the catholyte showed a small yield of butyl valerate. Two additional peaks were noted, and additional analysis indicated these products to be dibutyl methylmalonate, and dibutyl butylmethylmalonate.

A number of reactions are possible in the reduction of butyl halide at a graphite electrode. The butyl halide can be reduced to the butyl anion, which can then react:

The anion can also extract a hydrogen from the quaternary salt, to give reactions:

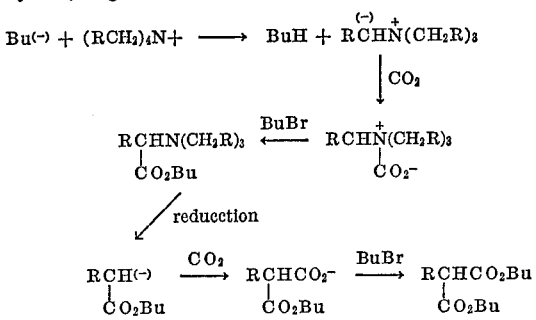

Support for the foregoing as a route in the porduction of malonates was found in the isolation of a salt from the electrolysis of butyl iodide in tetraproplyammonium iodide solution in dimethylformamide, in the presence of carbon dioxide, which salt had nuclear magnetic resonance spectra consistent with the structure:

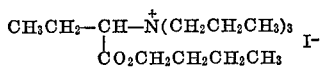

The malonate production is an ester forming reaction, although forming the alkanoate moiety from an alkyl of the ammonium ion, rather than from the aliphatic halide. If desired, the malonate forming reaction can be minimized, or avoided, by using active electrodes, such as mercury, lead, etc., or by using quaternary salts with long chain alkyl groups, or salts other than quaternary salts.

EXAMPLE 6

A divided cell was employed wtih mercury cathode and platinum anode, and a catholyte of 0.1 molar sodium iodide in dimethylformamide. The catholyte was deaereated with nitrogen, and saturated with $CO_2$. Potential was applied to produce $-1.7$ cathode volts, and 10 ml. butylbromide was added to the catholyte. The electrolysis cell was heated to cause reaction to convert the butyl bromide to butyl iodide. An additional 2 ml. of butyl bromide was added, with additional heating, and the electrolysis was run overnight. The electrolysis was stopped, after about 0.26 Faraday, and chromatograhy indicated the presence of butyl valerate. An attempted extraction of the product was not successful.

What is claimed is:

1. The process of preparing esters which comprises electrolyzing an electrolysis medium comprising carbon dioxide, an organo halide containing alkyl halogen, supporting electrolyte, aprotic solvent, and up to a small concentration of proton donor at the cathode and separating esters from the electrolysis mixture, in which the organo halide is reducible at the cathode under the electrolysis conditions employed and is relatively inert aside from its halide group and contains up to 20 carbon atoms.

2. The process of claim 1 in which a non-aqueous solvent and quaternary ammonium salt are employed.

3. The process of claim 1 in which a tetraalkylammonium halide is employed.

4. The process of claim 1 in which the halide is an alkyl halide and an alkyl alkanoate is obtained and recovered.

5. The process of claim 1 in which the halide is an alkenyl halide and an alkenyl alkenoate is obtained and recovered.

6. The process of claim 1 in which the halide is an alkyl halide and allyl crotonate is produced and recovered.

7. The process of claim 2 in which the cathode potential is such that a predominant amount of the halide reacted is reduced by taking up two electrons.

8. The process of claim 2 in which an aprotic solvent having a dielectric constant of at least 50 is employed with substantial absence of water and other proton donors.

9. The process of claim 2 in which the cathode voltage is more negative than −1.8 volts (vs. saturated calomel electrode) but not sufficient to reduce any substantial amount of the supporting electrolyte.

10. The process of claim 2 in which RX is reacted and a $RCO_2R$ product is recovered from the catholyte in the organic phase in an extraction procedure, and in which R is an aliphatic group and X is a halide.

11. The process of claim 2 in which RX is reacted and a $RCO_2R$ product is recovered by distillation, and in which R is an aliphatic group and X is a halide.

12. The process of claim 2 in which an aliphatic halide is added over the course of electrolysis so that only increments are present at any time in the electrolysis medium.

13. The process of claim 2 in which a chemically reactive electrode is used.

14. The process of claim 2 in which the electrode is selected from the group consisting of lead and mercury materials.

15. The process of claim 2 in which the halide is selected from the group consisting of chlorides and bromides.

16. The process of claim 2 in which benzyl halide is converted to benzyl phenylacetate.

17. The process of claim 2 in which an inert electrode is employed and a malonate ester is produced.

References Cited
UNITED STATES PATENTS

| | | | |
|---|---|---|---|
| 3,032,489 | 5/1962 | Loveland | 204—73 R |
| 3,344,045 | 9/1967 | Neikam | 204—59 R |
| 3,344,046 | 9/1967 | Neikam | 204—59 R |
| 3,390,066 | 6/1968 | Baizer | 204—72 |
| 3,397,226 | 8/1968 | Fenton | 204—59 R |

F. C. EDMUNDSON, Primary Examiner

U.S. Cl. X.R.

204—72